(12) United States Patent
Lin

(10) Patent No.: US 7,263,390 B2
(45) Date of Patent: Aug. 28, 2007

(54) FOLDING MOBILE PHONE

(75) Inventor: Yi-Lan Lin, Lu Chao (TW)

(73) Assignee: Benq Corporation, Taoyuan (TW)

( * ) Notice: Subject to any disclaimer, the term of this patent is extended or adjusted under 35 U.S.C. 154(b) by 601 days.

(21) Appl. No.: 10/757,484

(22) Filed: Jan. 15, 2004

(65) Prior Publication Data
US 2004/0147296 A1    Jul. 29, 2004

(30) Foreign Application Priority Data
Jan. 16, 2003    (TW) .............................. 92200799 U

(51) Int. Cl.
*H04M 1/00*    (2006.01)
(52) U.S. Cl. .................. 455/575.1; 455/90.3; 455/128; 455/347
(58) Field of Classification Search ............. 455/575.1, 455/90.3, 128, 347
See application file for complete search history.

(56) References Cited
U.S. PATENT DOCUMENTS 5,923,751 A * 7/1999 Ohtsuka et al. ........ 379/433.13
6,292,980 B1 * 9/2001 Yi et al. ....................... 16/303
6,917,824 B2 * 7/2005 Kobayashi ............... 455/575.3

* cited by examiner

*Primary Examiner*—Nay Maung
*Assistant Examiner*—Dominic E. Rego
(74) *Attorney, Agent, or Firm*—Troxell Law Office, PLLC

(57) ABSTRACT

A folding mobile phone comprises a panel housing, a motherboard housing and a blocker. The panel housing is hingedly connected with the motherboard housing by a pivot portion of the motherboard housing to have the folding mobile phone in a closed position or in an open position. The blocker includes a sliding track and a blocking mechanism, wherein the sliding track is mounted at the motherboard housing, perpendicular to the rotation axis of the pivot portion, and the blocking mechanism moves back and forth between a first brake location and a second brake location of the sliding track. When the blocking mechanism moves to the first brake location and the second brake location respectively, it produces respective interference in the pivot portion such that the panel housing and the motherboard housing are unfolded at different angles.

15 Claims, 7 Drawing Sheets

FOLDING MOBILE PHONE

FIELD OF THE INVENTION

The present invention relates to a folding mobile phone, more particularly, to a folding mobile phone whose panel housing and motherboard housing can be unfolded at two different angles.

BACKGROUND OF THE INVENTION

With rapid advancement of the wireless communication technology, a mobile phone has become the mainstream product in current technology. Because of the very considerable potential of the mobile phone business, the market competition for mobile phones is relatively fierce. The products produced by the manufacturers must have both various functions and impressing shapes to win in the mobile communication market.

Please refer to FIG. 1A illustrating a schematic perspective diagram of a conventional folding mobile phone 10. The folding mobile phone 10 is a popular model in the current market and comprises a panel housing 11 and a motherboard housing 12, wherein a display panel and a receiver are disposed on the inner surface 110 of the panel housing 11, and an operating panel (including numeral keys and function keys) and a transmitter are disposed on the inner surface 120 of the motherboard housing 12. Furthermore, the electronic components having the function of wireless transmission are mounted inside the motherboard housing 12.

As shown in FIG. 1A, the panel housing 11 and the motherboard housing 12 are hingedly connected together by a pivot portion 13. The pivot portion 13 is mounted on the motherboard housing 12 and connected with the panel housing 11. The panel housing 11 and the motherboard housing 12 are in an open position or in a closed position by rotation of the pivot portion 13. The inner surface 110 of the panel housing 11 corresponds to the inner surface 120 of the motherboard housing 12. When the folding mobile phone 10 is not in use, the inner surface 120 of the motherboard housing 12 is covered with the inner surface 110 of the panel housing 11, as shown in FIG. 1B. When the folding mobile phone 10 is in use, the inner surface 120 of the motherboard housing 12 and the inner surface 110 of the panel housing 111 are unfolded for operation, as shown in FIG. 1A.

However, when the conventional folding mobile phone 10 is unfolded, the panel housing 11 joins the motherboard housing 12 only at a specific angle such as 170° with a stopper 14 to constrain the rotation of the pivot portion 13. Hence, the unfolding angle between the panel housing 11 and the motherboard housing 12 is limited to one. The stopper 14 can be mounted at the outer surface of the motherboard housing 12 or at the outer surface of the panel housing 11 to interfere the rotating angle of the panel housing 111 such that the unfolding angle between the panel housing 11 and the motherboard housing 12 is limited to a specific one.

Since only one unfolding angle is formed between the panel housing 11 and the motherboard housing 12 of the conventional folding mobile phone 10, it is not suitable for the face shape of every user. At the same unfolding angle, it might be too large for some people and too small for the other people. Hence, it is inconvenient for the consumers to use.

In view of the above, those skilled in this art endeavor to improve the products so as to solve the disadvantages in the prior art to meet the needs of consumers and to enhance the market competition of products.

SUMMARY OF THE INVENTION

The objective of the present invention is to provide a folding mobile phone having two-stage adjustment in its unfolding angle so as to match the face shapes of different users and to facilitate operation.

The folding mobile phone in this invention includes a panel housing, a motherboard housing, a blocker and a braking means. The panel housing and the motherboard housing are hingedly connected together by a pivot portion. By means of rotation of the pivot portion, the folding mobile phone is in an open position or in a closed position.

The blocker of this invention comprises a sliding track, a blocking mechanism and a first spring. The sliding track having a first brake location and a second brake location is mounted at the interior side of the motherboard housing. The blocking mechanism slides back and forth between the first brake location and the second brake location of the sliding track, perpendicular to the rotation axis of the pivot portion. Furthermore, the inner surface of the motherboard housing has an opening corresponding to the sliding track. When the blocking mechanism moves to the first brake location, the front end of the blocking mechanism protrudes outward from the opening and interferes in the rotation of the pivot portion to constrain the unfolding angle constructed by the panel housing and the motherboard housing. At this time, the braking means is activated to fix the blocking mechanism at the first brake location of the sliding track, and thus, the unfolding angle between the panel housing and the motherboard housing is maintained at a first specific angle. If the blocking mechanism is released from the braking means, the first spring of the blocker will push the blocking mechanism to the second brake location such that the front end of the blocking mechanism will return to the interior of the motherboard housing. Hence, another level of interference (or non-interference) in the rotation of the pivot portion is produced to unfold the panel housing and the motherboard housing at a second specific angle.

The braking means of this invention includes a slide rail, a wedge slider and a second spring. The blocking mechanism has slots corresponding to the wedge slider. The slide rail is mounted at the interior side surface of the motherboard housing. The wedge slider slides back and forth between a first position and a second position of the slide rail, in parallel with the rotation axis of the pivot portion. When the blocking mechanism moves to the first brake location of the sliding track, the second spring pushes the wedge slider to the first position such that the wedge slider can be inserted into the slot of the blocking mechanism to hold up the blocking mechanism. Moreover, when the wedge slider moves to the second position and comes out from the slot to separates from the blocking mechanism, the first spring of the blocker pushes the blocking mechanism to the second brake location.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
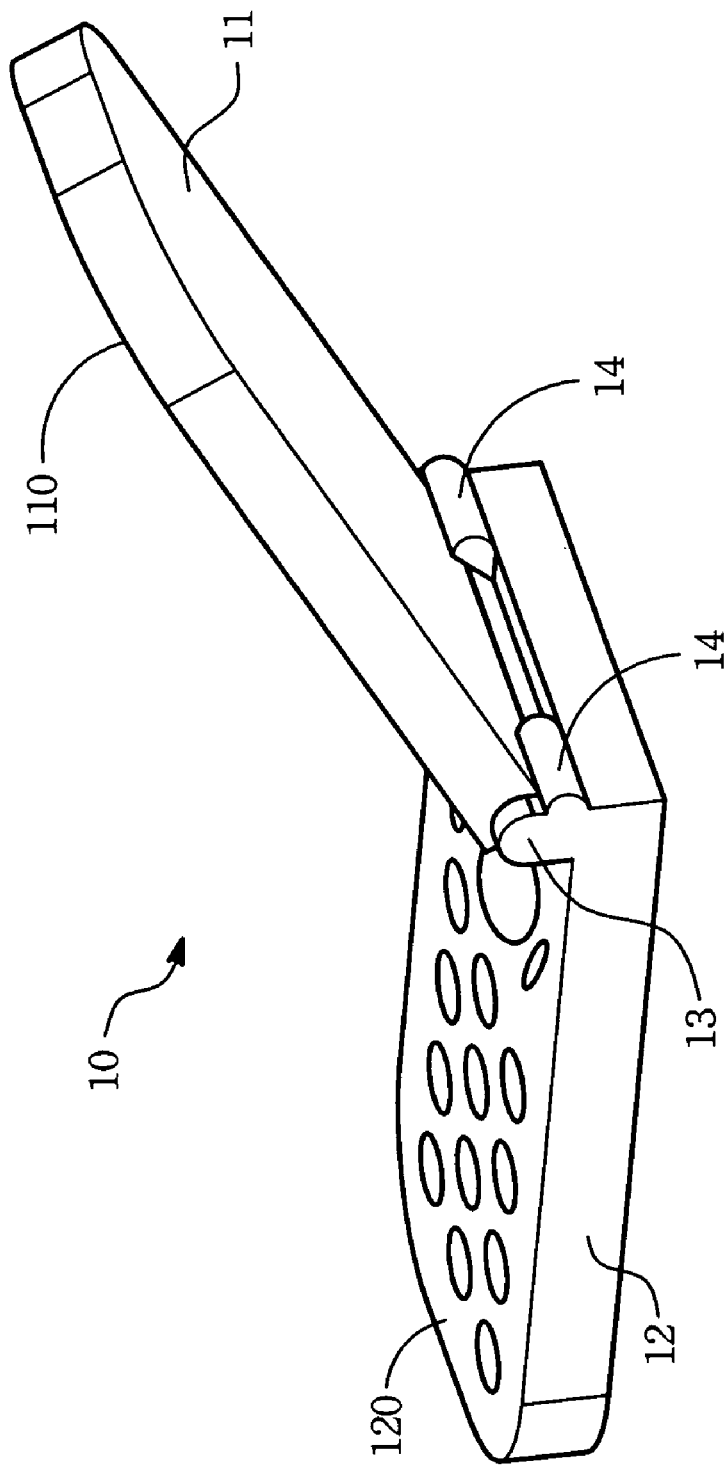
FIGS. 1A and 1B are schematic perspective diagrams of a folding mobile phone in the prior art.
Figure 1B:
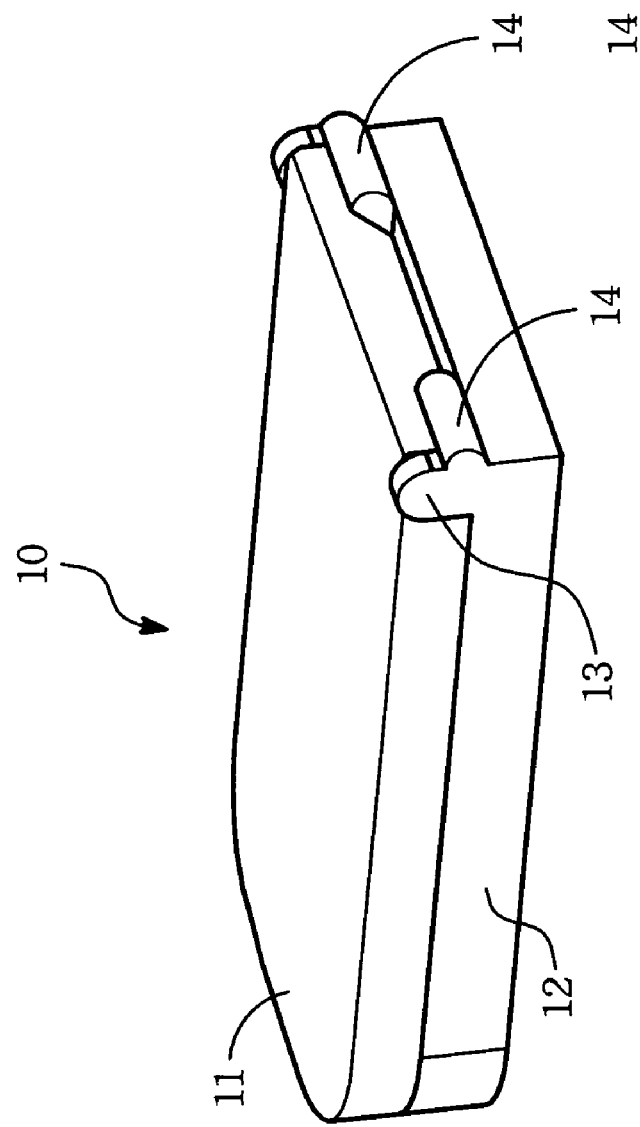
Figure 2A:
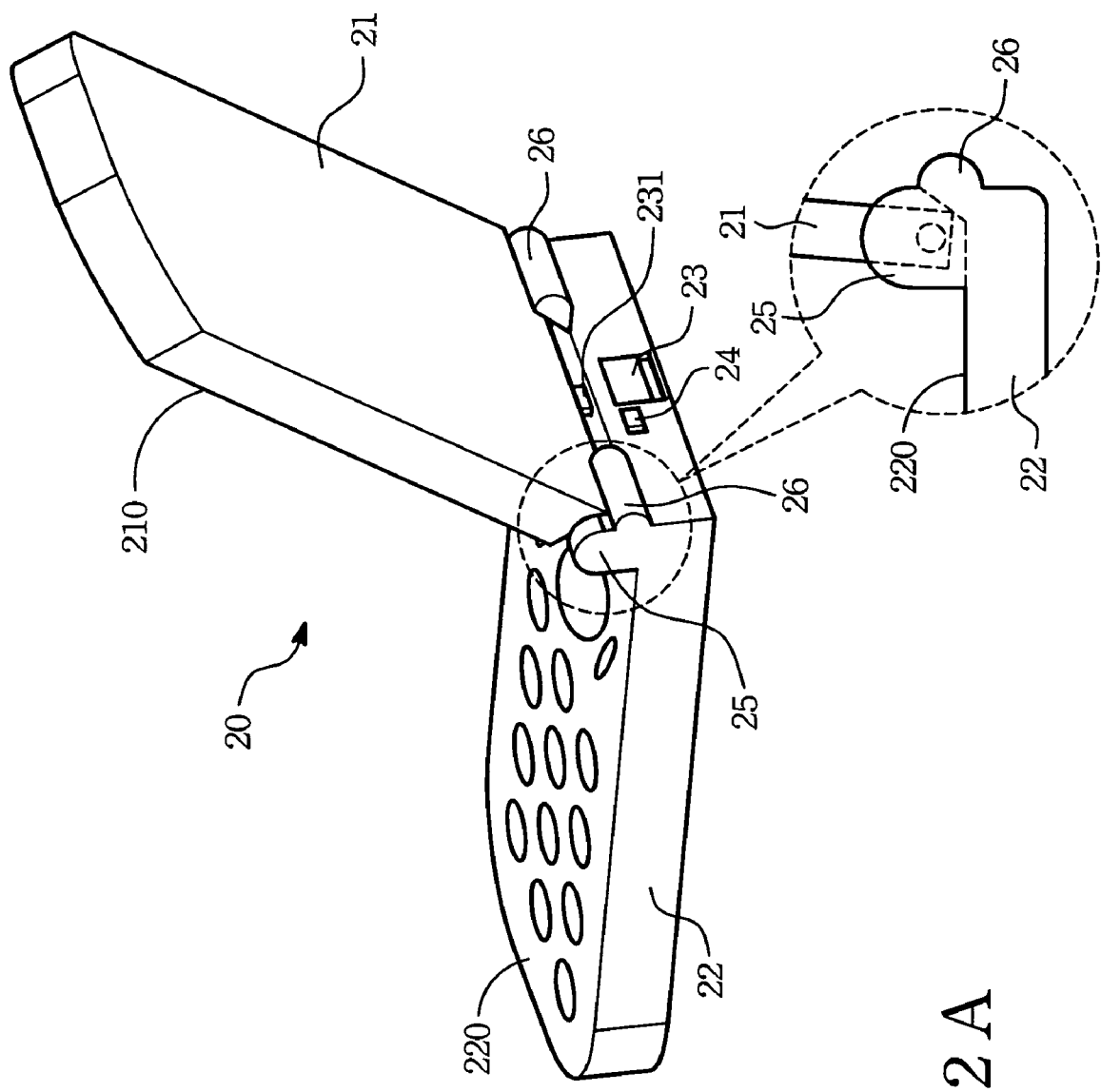
FIGS. 2A and 2B are schematic perspective diagrams of a folding mobile phone in accordance with this invention.
Figure 2B:
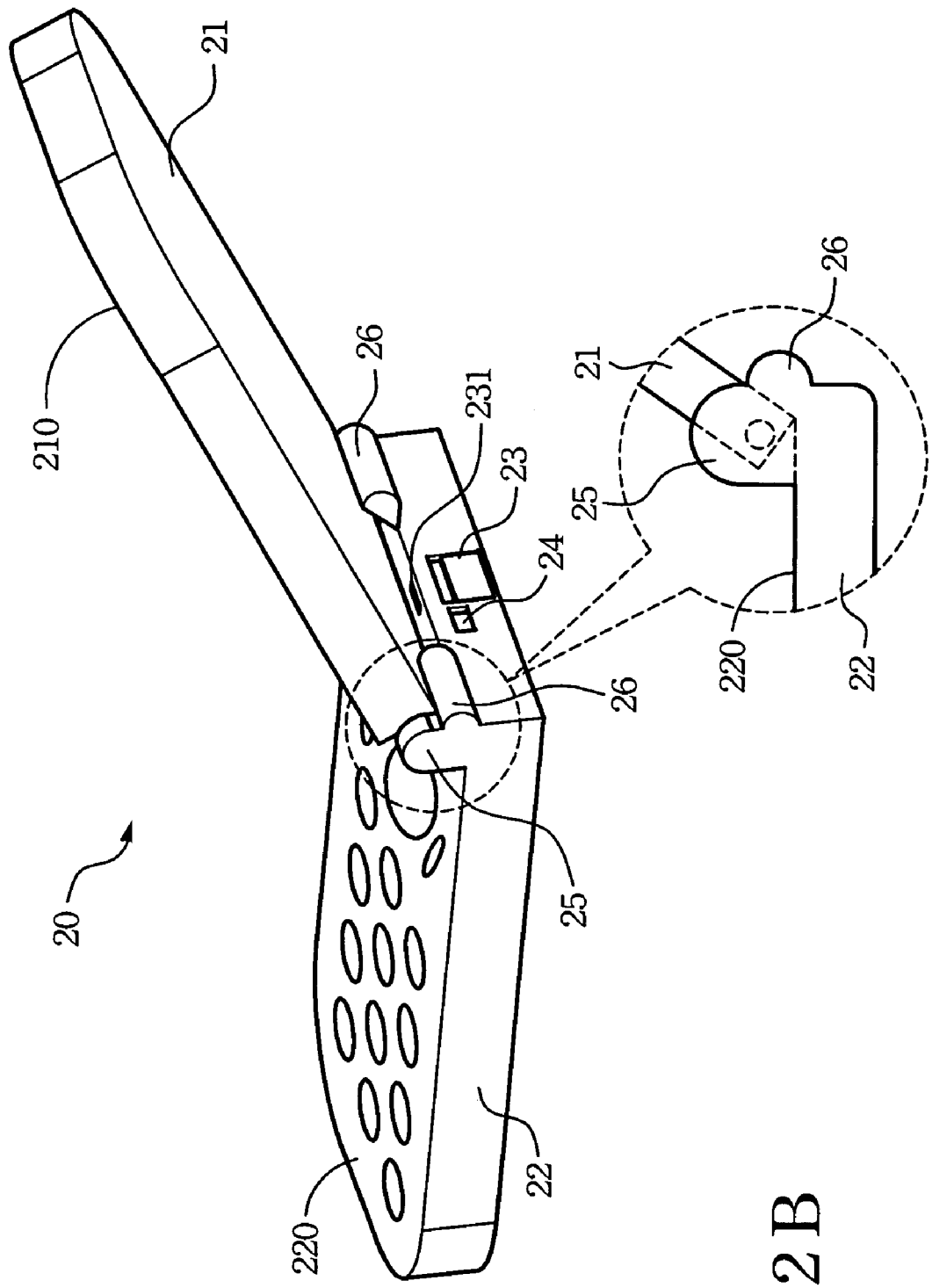

Please refer to FIGS. 2A and 2B, which are schematic perspective diagrams of a folding mobile phone 20 in accordance with this invention. The folding mobile phone 20 includes a panel housing 21, a motherboard housing 22, a blocker 23 and a braking means 24. The panel housing 21 and the motherboard housing 22 are hingedly connected together by a pivot portion 25. By rotation of the pivot portion 25, the folding mobile phone 20 is in an open position or in a closed position. The pivot portion 25 is mounted on the motherboard housing 22. Alternatively, it can be mounted on the panel housing 21. When the mobile phone 20 is in a closed position, the inner surface 210 of the panel housing 21 is stacked on the inner surface 220 of the motherboard housing 22 face to face. At this time, the length of the mobile phone 20 is diminished to approximately half of the original unfolded length so as to facilitate putting the folding mobile phone 20 away. Moreover, the display panel and the operating panel can be hidden from damage caused by an external force. The blocker 23 is mounted at the motherboard housing 22 in which a blocking mechanism 231 can move back and forth between a first brake location and a second brake location (the details are described in the next paragraph) and can be positioned by the braking means 24. Hence, the blocking mechanism 231 can produce a first interference and a second interference in the rotation of the pivot portion 25 and thus two different unfolding angles between the panel housing 21 and the motherboard housing 22 can be produced to facilitate the operation of the mobile phone 20. The interference of the blocker 23 in the rotation of the pivot portion 25 and the approach to brake the blocking mechanism 231 with the braking means 24 are described below.

Figure 3:
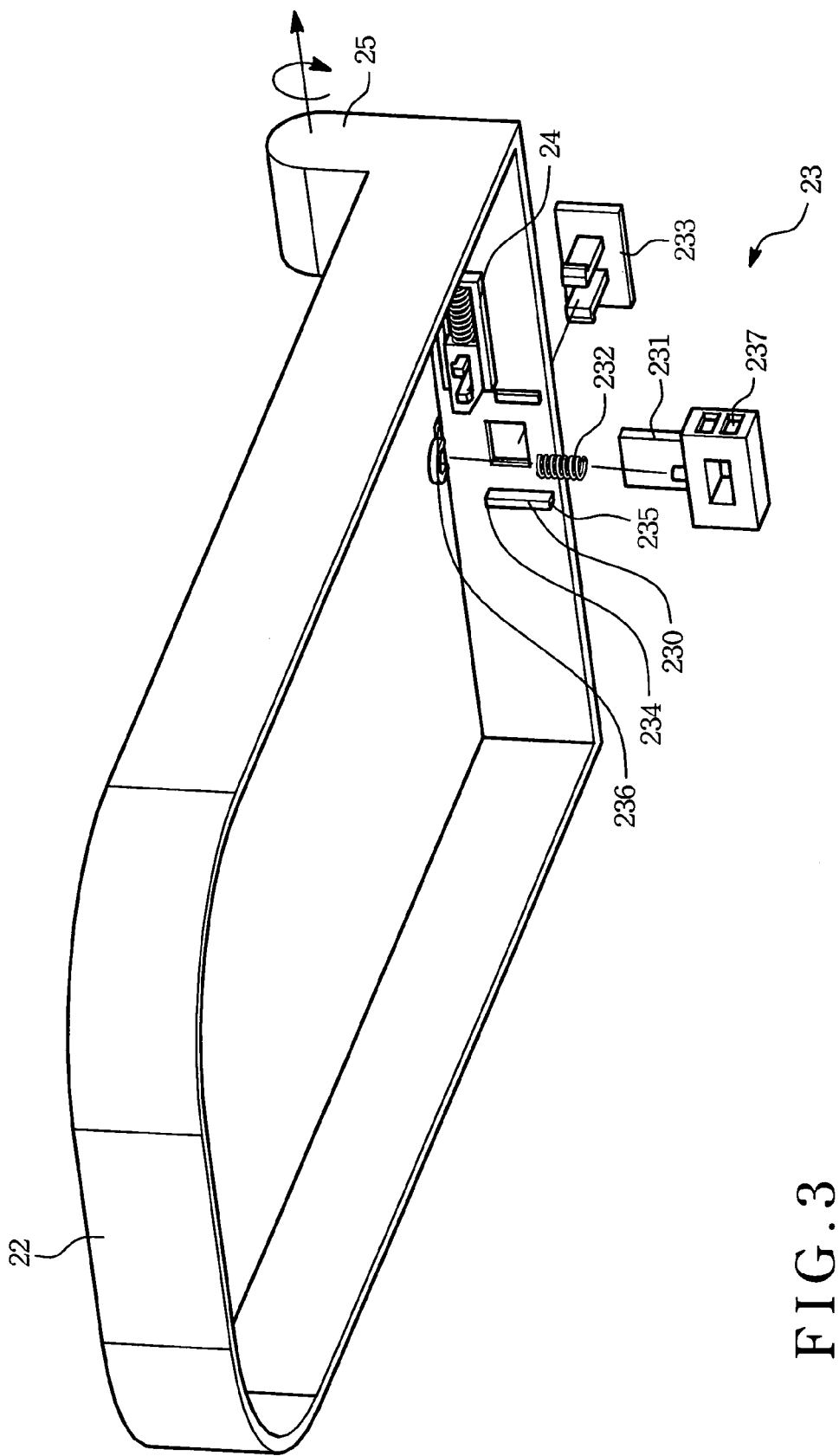
FIG. 3 is a schematic exploded perspective diagram of a blocker in accordance with this invention.

Please refer to FIG. 3, which is a schematic exploded perspective diagram of the blocker 23 in accordance with this invention. The blocker 23 mounted inside the motherboard housing 22 comprises a sliding track 230, the blocking mechanism 231, a first spring 232 and an angle adjustment knob 233. The sliding track 230 is mounted at the interior side of the motherboard housing 22. The blocking mechanism 231 slides back and forth between a first brake location 234 and a second brake location 235 of the sliding track 230, perpendicular to the rotation axis of the pivot portion 25. Furthermore, the inner surface 220 of the motherboard housing 22 has an opening 236 corresponding to the sliding track 230. When the blocking mechanism 231 moves to the first brake location 234, the front end of the blocking mechanism 231 protrudes from the opening 236 and interferes in the rotation of the pivot portion 25 to constrain the unfolding angle constructed by the panel housing 21 and the motherboard housing 22. Then, the braking means 24 is activated to fix the blocking mechanism 231 at the first brake location 234 of the sliding track 230. Hence, the panel housing 21 and the motherboard housing 22 are unfolded at a first specific angle, as shown in FIG. 2A. If the blocking mechanism 231 is released from the braking means 24, the first spring 232 of the blocker 23 will push the blocking mechanism 231 to the second brake location 235 and the front end of the blocking mechanism 231 will return to the interior of the motherboard housing 22. Hence, another level of interference (or non-interference) in the rotation of the pivot portion 25 is produced to unfold the panel housing 21 and the motherboard housing 22 at a second specific angle, as shown in FIG. 2B. Since the blocking mechanism 231 is mounted inside motherboard housing 22, it is inconvenient for the user to adjust the unfolding angle of the mobile phone 20 with the blocking mechanism 231. The angle adjustment knob 233 of the blocker 23 can be designed to protrude out of the motherboard housing 22 and is integrally combined to the blocking mechanism 231 in the motherboard housing 22 such that the angle adjustment knob 233 moves synchronously with the blocking mechanism 231. During operation, as long as the angle adjustment knob 233 is pushed from the outside of the motherboard housing 22, the blocking mechanism 231 can be simultaneously driven to move on the sliding track 230 to adjust the unfolding angle between the panel housing 21 and the motherboard housing 22.

Figure 4:
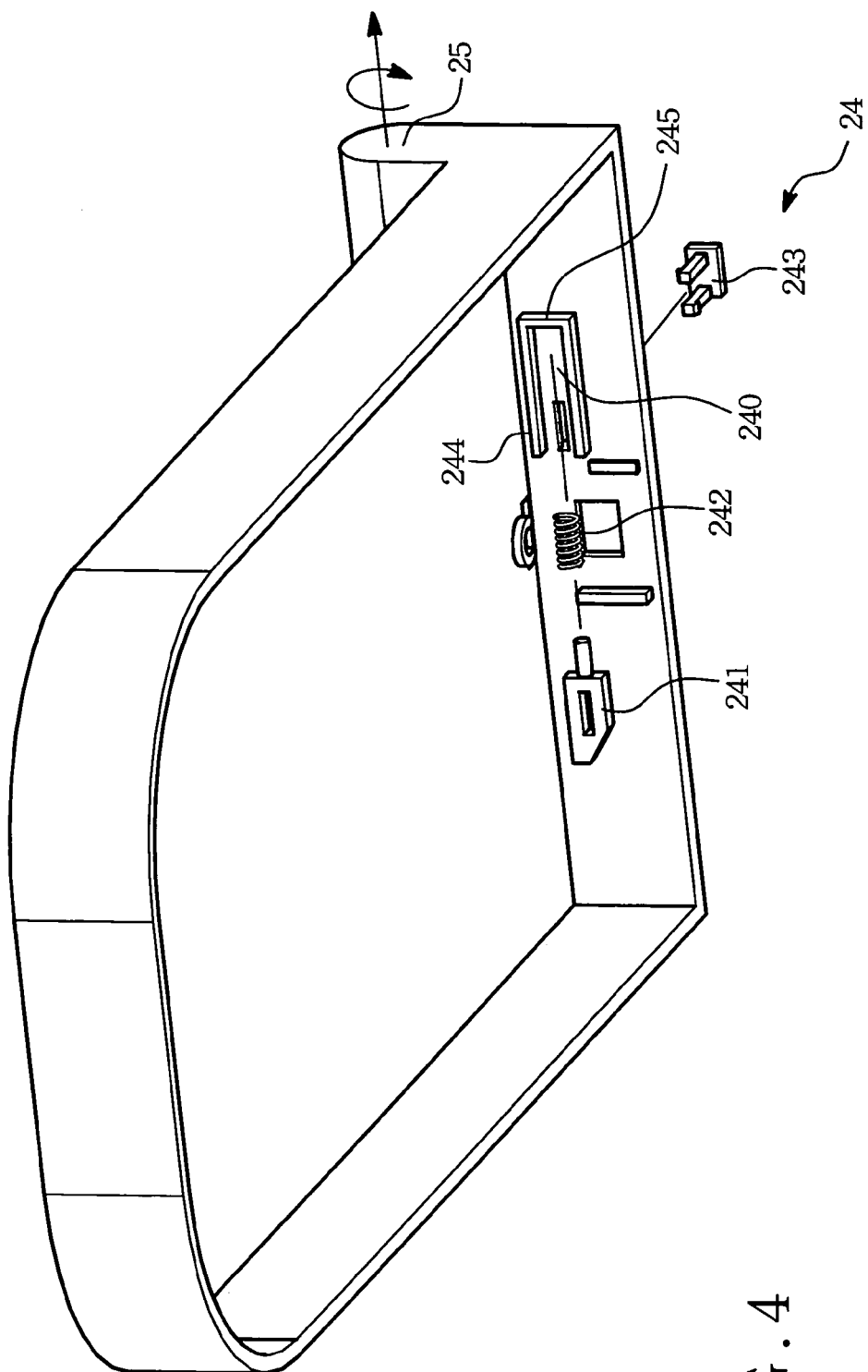
FIG. 4 a schematic exploded perspective diagram of a braking means in accordance with this invention.

FIG. 4 is a schematic exploded perspective diagram of the braking means 24 in accordance with this invention. The braking means 24 includes a slide rail 240, a wedge slider 241, a second spring 242 and a brake knob 243. Referring to FIGS. 3 and 4, slots 237 corresponding to the wedge slider 241 are disposed at the lateral of the blocking mechanism 231 so as to cooperate with the braking means 24. The slide rail 240 is mounted at the interior side surface of the motherboard housing 22. The wedge slider 241 slides back and forth between a first position 244 and a second position 245 of the slide rail 240, in parallel with the rotation axis of the pivot portion 25.

When the blocking mechanism 231 moves to the first brake location 234, the second spring 242 pushes the wedge slider 241 to the first position 244 such that the wedge slider 241 can be inserted into the slot 237 of the blocking mechanism 231 to hold up the blocking mechanism 231. Moreover, when the wedge slider 241 moves to the second position 245, it comes out from the slot 237 and separates from the blocking mechanism 231. At this time, the first spring 232 of the blocker 23 pushes the blocking mechanism 231 to the second brake location 235 such that the blocking mechanism 231 protruding from the opening 236 returns to the interior of the motherboard housing 22 to make another level of interference (or non-interference) in the rotation of the pivot portion 25. Hence, the panel housing 21 and the motherboard housing 22 can be freely unfolded or folded. Since the wedge slider 241 is mounted at the interior side of the motherboard housing 22, it is inconvenient for the user to drive the wedge slider 241 to brake the blocker 23. Therefore, the brake knob 243 of the braking means 24 is disposed at the exterior side of the motherboard housing 22 and is integrally combined to the wedge slider 241 such that brake knob 243 moves synchronously with the wedge slider 241. During operation, as long as the brake knob 243 is pushed from the outside of the motherboard housing 22, the wedge slider 241 can be simultaneously driven to move on the slide rail 240 to brake the unfolding angle between the panel housing 21 and the motherboard housing 22.

Referring to FIG. 2B again, a fixed stopper 26 can be mounted at the exterior side of the motherboard housing 22 in this invention. The fixed stopper 26 produces less interference in the pivot portion 25 than the blocking mechanism 231 at the first brake location 234 does. When the blocking mechanism 231 of the blocker 23 moves to the second brake location 235, the panel housing 21 and the motherboard housing 22 are unfolded at the second specific angle larger than the first specific angle through the design of the fixed stopper 26.

Figure 5:
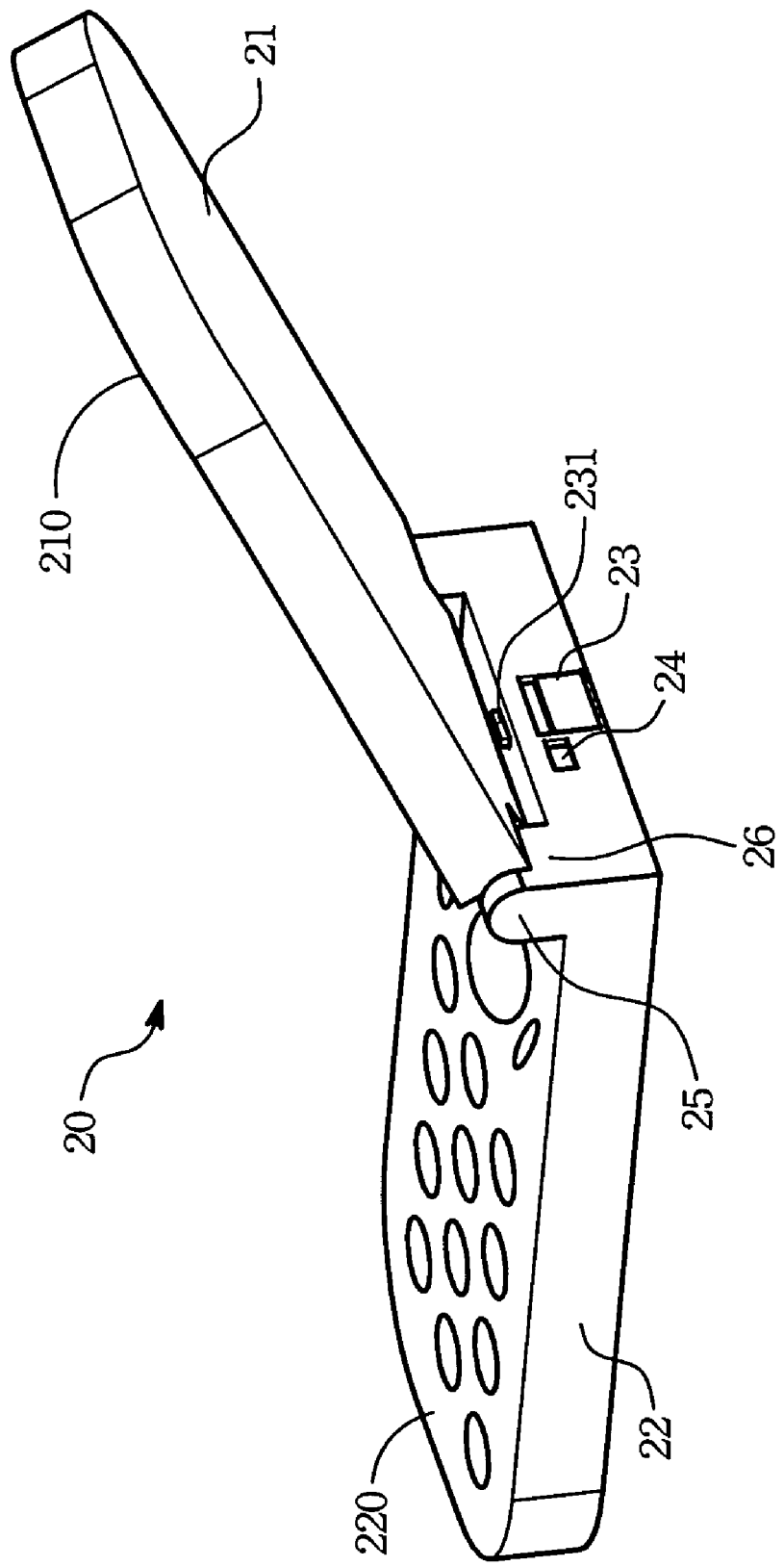
FIG. 5 is a schematic perspective diagram illustrating that the panel housing and the motherboard housing are unfolded at the second specific angle through the blocking mechanism in accordance with this invention.

Referring to FIG. 5, the second specific unfolding angle between the panel housing 21 and the motherboard housing 22 can also be achieved by the blocking mechanism 231 of the blocker 23 without the design of the fixed stopper 26. That is, when the blocking mechanism 231 moves to the second brake location 235, part of the blocking mechanism 231 still protrudes from the opening 236 to produce less interference in the pivot portion 25 than the blocking mechanism 231 at the first brake location 234 does such that the panel housing 21 and the motherboard housing 22 are unfolded at the second specific angle larger than the first specific angle.

Therefore, the folding mobile phone in this invention can provide a selectively two-stage adjustment in the unfolding angles between the panel housing and the motherboard housing through different levels of interferences produced by the blocking mechanism in the pivot portion so as to enhance the operation convenience for users and to increase the market competition of mobile phones.

As is understood by a person skilled in the art, the foregoing preferred embodiment of the present invention is illustrated of the present invention rather than limiting of the present invention. For instance, the blocker and the braking means of this invention can also be mounted at the outside of the motherboard housing or at the panel housing. Furthermore, the panel housing and the motherboard housing could be a first housing and a second housing respectively. The construction of the blocker and the braking means can be in other forms. It is intended to cover various modifications and similar arrangements included within the spirit and scope of the appended claims, the scope of which should be accorded the broadest interpretation so as to encompass all such modifications and similar structure.

What is claimed is:

1. A folding mobile phone, comprising:
   a panel housing;
   a motherboard housing, having a pivot portion and hingedly connected with said panel housing by said pivot portion; and
   a blocker, including a sliding track and a blocking mechanism; wherein said sliding track is mounted at said motherboard housing, perpendicular to a rotation axis of said pivot portion and including a first brake location and a second brake location, and said blocking mechanism moves back and forth on said sliding track to interfere respectively at said first brake location and said second brake location;
   wherein when said blocking mechanism moves to said first brake location of said sliding track, said blocking mechanism produces a first interference in said pivot portion such that said panel housing and said motherboard housing are unfolded at a first angle, and when said blocking mechanism moves to said second brake location of said sliding track, said blocking mechanism produces a second interference in said pivot portion such that said panel housing and said motherboard housing are unfolded at a second angle.

2. The folding mobile phone of claim 1, further including a braking means which brakes said blocking mechanism when said blocking mechanism of said blocker moves to said first brake location.

3. The folding mobile phone of claim 2, wherein said blocker further including a first spring which pushes said blocking mechanism to said second brake location after said blocking mechanism is released from said braking means.

4. The folding mobile phone of claim 2, wherein said braking means comprises a slide rail, a wedge slider and a second spring, wherein said wedge slider moves back and forth between a first position and a second position of said slide rail, in parallel with the rotation axis of said pivot portion, and said second spring pushes said wedge slider to said first position to brake said blocking mechanism when said blocking mechanism moves to said first brake location.

5. The folding mobile phone of claim 4, wherein a slot corresponding to said wedge slider is disposed at the lateral of said blocking mechanism and said wedge slider is inserted into said slot of said blocking mechanism when said blocking mechanism moves to said first brake location.

6. The folding mobile phone of claim 4, wherein said wedge slider is disposed at the interior side of said motherboard housing, adjacent to said blocking mechanism and a brake knob is disposed at the exterior side of said motherboard housing to be combined to said wedge slider such that said brake knob can be pushed by a user from the outside of said motherboard housing to moves synchronously with said wedge slider on said slide rail so as to brake the unfolding angle between said panel housing and said motherboard housing.

7. The folding mobile phone of claim 1, wherein said blocking mechanism is disposed at the interior side of said motherboard housing and an angle adjustment knob is disposed at the exterior side of said motherboard housing to be combined to said blocking mechanism such that said angle adjustment knob can be pushed by a user from the outside of said motherboard housing to drive said blocking mechanism to simultaneously move on said sliding track so as to adjust the unfolding angle between said panel housing and said motherboard housing.

8. The folding mobile phone of claim 1, wherein the inner surface of said panel housing is stacked on the inner surface of said motherboard housing face to face when said folding mobile phone is in a closed position.

9. The folding mobile phone of claim 1, wherein a fixed blocking mechanism is mounted at the exterior side of said motherboard housing and produces less interference in said pivot portion than said first interference produced by said blocking mechanism at said first brake location.

10. A folding mobile phone, comprising:
    a first housing;
    a second housing, having a pivot portion and hingedly connected with said first housing by said pivot portion; and
    a blocker, having a sliding track substantially perpendicular to a rotation axis of said pivot portion, selectively interferes with said first housing at a first brake location and a second brake location;
    wherein when said blocker interferes with said first housing at said first brake location, said first housing and said second housing are unfolded at a first angled, and when said blocker interferes with said first housing at said second brake location, said first housing and the second housing are unfolded at a second angle.

11. The folding mobile phone of claim 10, wherein a blocking mechanism is installed in said blocker and moves back and forth at said first brake location and said second brake location on said sliding track to interfere said first housing.

12. The folding mobile phone of claim 11, wherein said folding mobile phone comprises a braking means which selectively brakes said blocking mechanism at said first brake location or said second brake location.

13. The folding mobile phone of claim 12, wherein said blocker further comprises a first spring to push said blocking mechanism back to said second location after said blocking mechanism is released from said brake means.

14. The folding mobile phone of claim 12, wherein said braking means comprises a slide rail parallel with said rotation axis, a wedge slider and a second spring pushes said wedge slider to move on said slide rail to brake said blocking mechanism.

15. The folding mobile phone of claim 14, wherein a slot corresponding to said wedge slider is disposed at the lateral of said blocking mechanism and said wedge slider is inserted into said slot to brake said blocking mechanism.

* * * * *